June 25, 1968  H. W. MEINERT  3,389,763
GUARD FOR TRACTOR POWER TAKEOFF SHAFT
Filed March 31, 1966  2 Sheets-Sheet 1
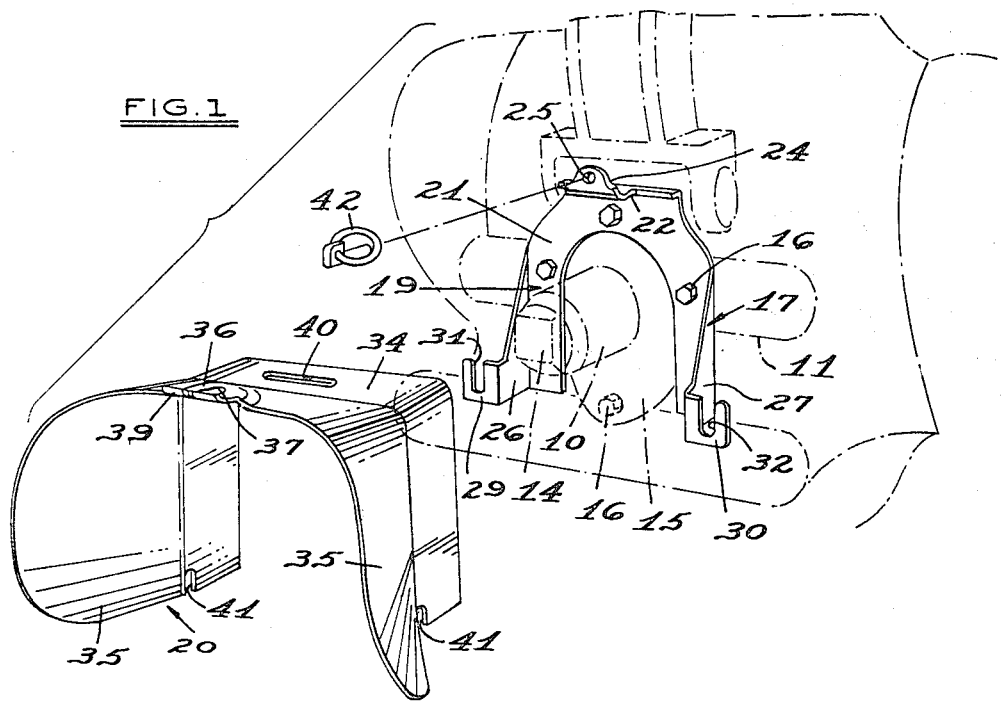
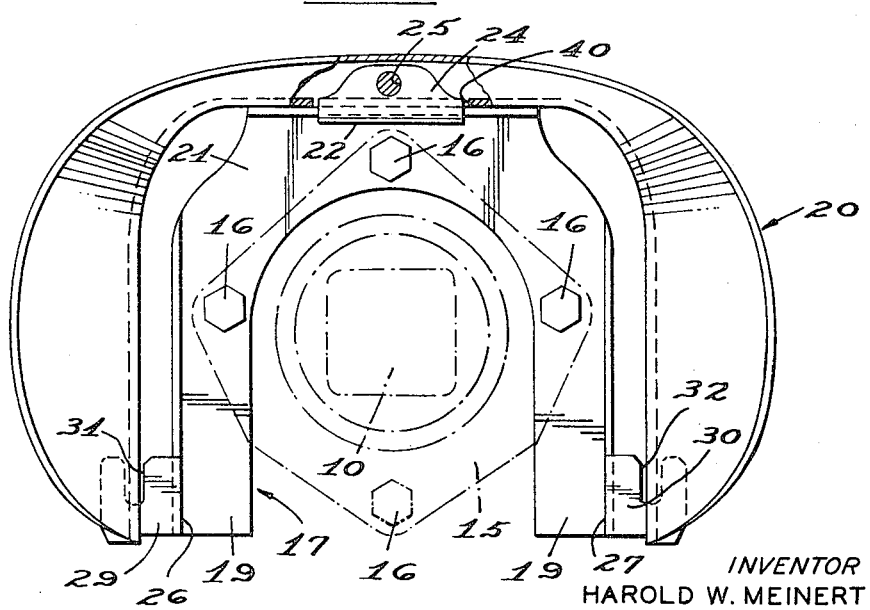
INVENTOR
HAROLD W. MEINERT
BY
P. F. Hilden
ATTORNEY June 25, 1968    H. W. MEINERT    3,389,763
GUARD FOR TRACTOR POWER TAKEOFF SHAFT
Filed March 31, 1966    2 Sheets-Sheet 2

INVENTOR
HAROLD W. MEINERT
BY
P. F. Hilder
ATTORNEY

United States Patent Office 3,389,763
Patented June 25, 1968

3,389,763
GUARD FOR TRACTOR POWER
TAKEOFF SHAFT
Harold W. Meinert, Birmingham, Mich., assignor to Ford
Motor Company, Dearborn, Mich., a corporation of
Delaware
Filed Mar. 31, 1966, Ser. No. 539,141
2 Claims. (Cl. 180—82)

ABSTRACT OF THE DISCLOSURE

A quick detachable tractor PTO shaft guard has an inverted U-shaped flange member attached to the tractor and extending about the top and sides of the shaft. A U-shaped guard member interfitting with the flange member extends outwardly from the wall of the tractor about the tractor about the top and sides of the shaft. The interfitting portions of the flange and the guard include an upstanding tab of the flange extending through a slot in the guard member and a quick detachable pin connector extends through the hole in the tab to hold the parts in assembled relation.

---

This invention relates to guards for tractor power takeoff shafts, commonly referred to as PTO shafts.

Most agricultural and general purpose tractors are provided with a PTO shaft projecting a short distance through a rear wall of the tractor center housing. The outer end of the PTO shaft is exposed to receive a universal joint and PTO drive shaft for driving an implement mounted on or trailed from the tractor. It is customary to provide an inverted, U-shaped guard secured to the tractor and overlying the top and sides of the PTO shaft. The guard is sufficiently large to extend about and prevent accidental contact with a universal joint mounted on the end of the PTO shaft when it is being used to drive an implement.

According to the present invention, the guard comprises a U-shaped flange member permanently bolted to the tractor and a U-shaped interfitting guard member which is held in assembled relation by a single, quick detachable pin connector of the linch pin type, whereby the guard member may be quickly removed without the use of tools when it is desired to have greater accessibility to the shaft for attached or detaching a universal joint.

Among the objects of the present invention are to provide a tractor PTO shaft guard which is readily removable and replaceable without the use of tools; to provide such a guard which is durable and economical to manufacture; and generally to improve PTO shaft guards of the type described.

Other objects, and objects relating to details and economies of construction will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming a part of this specification in which:

FIGURE 1 is an exploded, perspective view of the PTO guard, the flange member of the guard being shown secured to the center housing of a tractor, shown in broken line.

FIGURE 2 is a rear elevation of the guard in position on a tractor, a portion of the tractor being shown in broken line.

Figure 4:
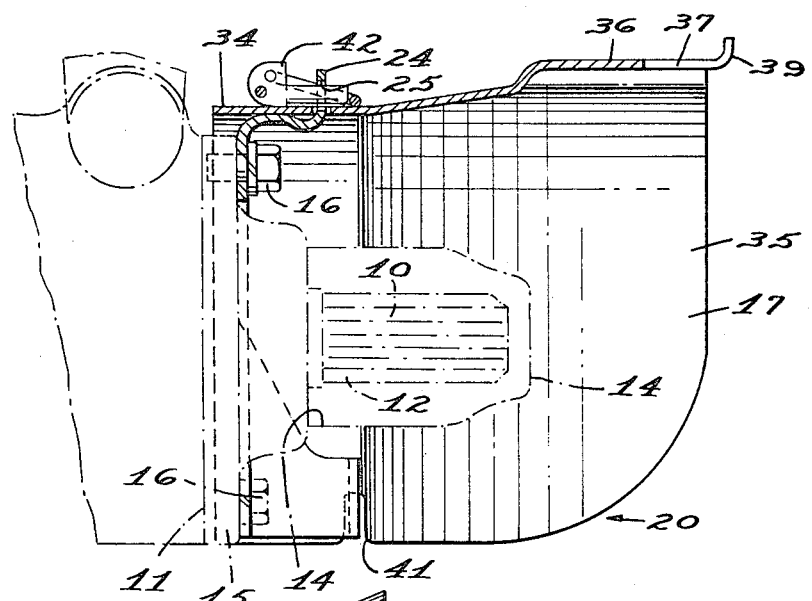
FIGURE 4 is a vertical section of the guard taken generally on the lnie 4—4 of FIGURE 3, a portion of the center housing of the tractor being shown in side elevation.
Figure 3:
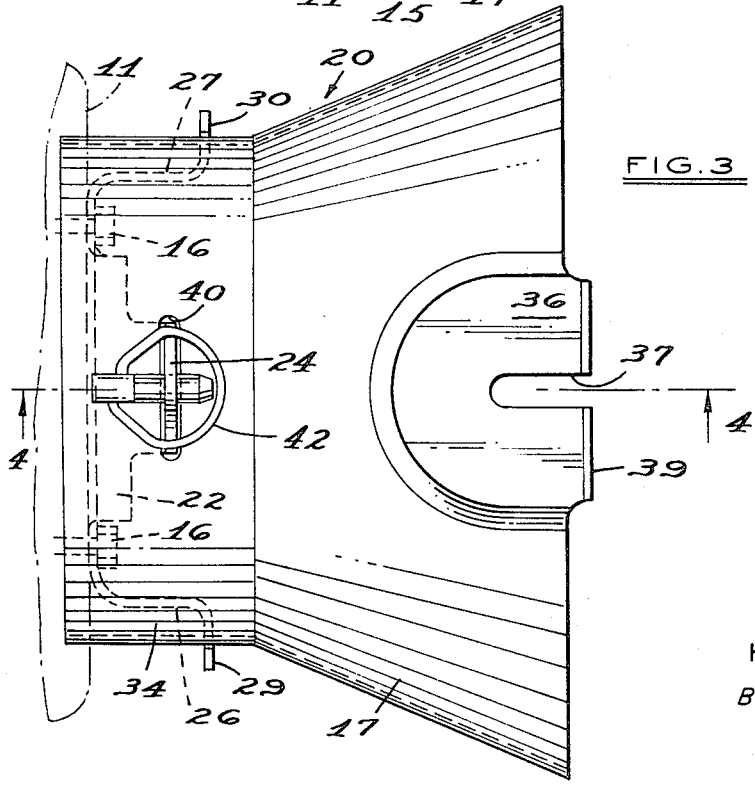
FIGURE 3 is a top plan view of the guard in place on a tractor, a portion of the center housing of the tractor being shown.

Referring now to the drawings, the PTO shaft 10 customarily is located at the rear of the tractor and projects through a wall 11 of the tractor rear axle for a short distance. The exposed end of the shaft is provided with splines 12 for receiving the yoke of a universal joint (not shown). When not in use, the exposed end of the PTO shaft normally is covered by a cap 14.

The rear end of the PTO shaft 10 is supported by a plate 15 secured to the wall 11 of the tractor housing, in this instance the center housing at the rear of the tractor, by a series of four bolts 16. Three of these bolts may be utilized to support a PTO shaft guard 17 extending rearwardly from the wall of the tractor housing and about the top and sides of the protruding shaft.

The PTO shaft guard 17 comprises a flange member 19 mounted on the tractor and a guard member 20 interfitting with and supported by the flange member, the guard member protecting against any accidental contact with the exposed end of the PTO shaft 10 or with a universal joint or other part mounted on this shaft.

The flange member 19 is formed of sheet metal and has a flat, vertical portion 21 abutting the wall 11 of the tractor housing and held in place by three of the bolts 16. A flange 22 projects rearwardly a short distance from the top of the flange member 19 and terminates in an upwardly extending tab 24 provided with a hole 25. A pair of vertical flanges 26 and 27 project rearwardly from hte lower portion of the flange member 19 and terminate in outwardly directed flange portions 29 and 30, which are located below the level of the PTO shaft end and have upwardly opening notches 31 and 32.

The guard member 20 is formed of sheet metal having an inverted, U-shaped cross section. This member is provided with a forward portion 34 overlying the flanges 22, 26 and 27 of the flange member 19 and a diverging rear portion 35 extending above and laterally to each side of the PTO shaft 10. In accordance with usual practice, the rear portion 35 of the guard member 20 may be provided with a horizontal seat 36 above and to the rear of the PTO shaft 10 for attachment of an additional guard when a shaft (not shown) is coupled to the PTO shaft and leads rearwardly. The seat 36 may be provided with a slot 37 and an upturned rear edge 39 for receiving the bolt for holding the shield extension in position.

The forward portion 34 of the guard member 20 is provided with a transverse slot 40 for reception of the tab 24 of the flange member. In addition, a pair of upwardly extending slots 41—41 are provide in the lower ends of the forward portion of this member to permit interengagement of these portions with the laterally extending flange portions 29 and 30 of the flange member. The arrangement is such that the guard member may be interfitted with the flange member by engaging the forward portion of the guard member over the flange member, the slotted portions of these two members interengaging as indicated in the drawings and the tab 24 extending upwardly through the slot 37. The guard member is locked in position by insertion of a linch pin 42 or other quick detachable pin fastener through the hole 25 of the tab. The assembly is then firmly locked at three points against disengagement.

The construction of the present invention provides for quick removal of the PTO guard member 20 without the use of any tools in order to facilitate attachment of a universal joint or pulley on the rear end of the PTO shaft 10. At the same time, it provides a rigid shield protecting the shaft and any attached member from accidental contact by the operator.

What is claimed is:

1. A PTO shaft guard for a tractor having a PTO shaft protruding a short distance from a wall of the tractor, said guard comprising an inverted, U-shaped, tractor-attached flange member extending about the top and sides of the shaft, a U-shaped guard member interfitting with the flange member and extending generally perpendicular outwardly from the wall of the tractor above and laterally spaced from each side of the shaft, the flange member having an upstanding tab above the shaft received within a slot formed in the overlying portion of the guard member, the tab projecting through the slot and being provided with a transverse hole, and a quick detachable pin connector extending through the hole to hold the parts in assembled relation.

2. A PTO shaft guard as claimed in claim 1, in which the lower portions of the guard member interfit with complementary portions of the flange member to retain said portions of the guard member.

References Cited

UNITED STATES PATENTS

| 2,267,421 | 12/1941 | Purdy | 280—153 |
| 2,443,035 | 6/1948 | Hardy | 64—3 |
| 2,618,980 | 11/1952 | Cook et al. | |
| 2,696,089 | 12/1954 | Heth | 180—14 X |

FOREIGN PATENTS 1,037,105  4/1953  France.

KENNETH H. BETTS, *Primary Examiner.*